United States Patent
Chikara et al.

(10) Patent No.: US 10,933,524 B2
(45) Date of Patent: Mar. 2, 2021

(54) ARM FIXING DEVICE AND REDUCER REPLACEMENT METHOD

(71) Applicant: FANUC CORPORATION, Yamanashi (JP)

(72) Inventors: Shinya Chikara, Yamanashi (JP); Shun Suyama, Yamanashi (JP); Tsuneyoshi Nakashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 15/966,518

(22) Filed: Apr. 30, 2018

(65) Prior Publication Data

US 2018/0319010 A1  Nov. 8, 2018

(30) Foreign Application Priority Data

May 2, 2017 (JP) ............................. JP2017-091882

(51) Int. Cl.
*B25J 3/04* (2006.01)
*B25J 19/00* (2006.01)
(Continued)

(52) U.S. Cl.
CPC ................. *B25J 3/04* (2013.01); *B23P 19/04* (2013.01); *B25J 18/007* (2013.01); *B25J 19/0066* (2013.01)

(58) Field of Classification Search
CPC .... B25J 19/0066; B25J 19/06; B25J 19/0004; B25J 19/00; B25J 18/007; B25J 3/04; B25J 9/102; B23P 19/04
See application file for complete search history.

(56) References Cited

U.S. PATENT DOCUMENTS 8,464,413 B1 * 6/2013 Prater .................... B25B 27/02
                                                         29/244
2008/0028883 A1    2/2008 Inada et al.
(Continued)

FOREIGN PATENT DOCUMENTS

CN    101022927 A    8/2007
CN    101543992 A    9/2009
(Continued)

OTHER PUBLICATIONS

JPO Translation of the Description of JP 08323658 A, Hidaka et al., Dec. 10, 1996. (Year: 2020).*
(Continued)

*Primary Examiner* — Daniel D Yabut
(74) *Attorney, Agent, or Firm* — Maier & Maier, PLLC

(57) ABSTRACT

Provided is an arm fixing device that includes: a bracket having close-contact surfaces that are brought into close contact with a mounting surface provided in a supporting member, and a mounting surface provided in an arm or a link for transmitting drive force to an arm, also having one of a screw hole or a through hole that is formed to penetrate each of the close-contact surfaces at a position corresponding to a position of the other of a screw hole or a through hole provided in each of the mounting surfaces, and bridged over the mounting surfaces such that each of the close-contact surfaces is brought into close contact with a corresponding one of the mounting surfaces; and a fastener that penetrates the through hole and is fastened to the screw hole.

7 Claims, 8 Drawing Sheets

(51) Int. Cl.
B25J 18/00 (2006.01)
B23P 19/04 (2006.01)

(56) References Cited

U.S. PATENT DOCUMENTS

| | | | |
|---|---|---|---|
| 2009/0114053 A1 | 5/2009 | Mikaelsson et al. | |
| 2011/0154937 A1 | 6/2011 | Liu et al. | |
| 2015/0174770 A1 | 6/2015 | Kagawa | |
| 2015/0246450 A1 | 9/2015 | Yoneda | |
| 2017/0028567 A1 | 2/2017 | Kabushiki | |

FOREIGN PATENT DOCUMENTS

| | | | |
|---|---|---|---|
| CN | 104723321 A | | 6/2015 |
| CN | 104875218 A | | 9/2015 |
| DE | 60317335 T2 | | 2/2008 |
| EP | 1 792 694 A1 | | 6/2007 |
| EP | 2886265 A2 | | 6/2015 |
| JP | H01-129091 U | | 9/1989 |
| JP | H05-039892 A | | 5/1993 |
| JP | H08-141973 A | | 6/1996 |
| JP | 08174469 A | * | 7/1996 |
| JP | H08-323658 A | | 12/1996 |
| JP | 2002-239967 A | | 8/2002 |
| JP | 2004-291116 A | | 10/2004 |
| JP | 2015-120205 A | | 7/2015 |
| JP | 2015-163414 A | | 9/2015 |
| JP | 2016-187858 A | | 11/2016 |
| WO | 2004007151 A1 | | 1/2004 |
| WO | 2013104417 A1 | | 7/2013 |

OTHER PUBLICATIONS

JPO Translation of the Description of JP 08174469 A, Kasuya, Jul. 9, 1996. (Year: 2020).*
Office Action dated Jan. 22, 2019 in corresponding Japanese Application No. 2017-091882; 6 pages.
Search Report submitted to Japanese Patent Office by an external searching organization dated Jan. 15, 2019 in corresponding Japanese Application No. 2017-091882; 31 pages.
Ohinese Office Action dated Dec. 3, 2019, in connection with corresponding CN Application No. 201810370502.1 (9 pgs., including machine-generated English translation).
Decision to Grant a Patent dated Jul. 16, 2019, in corresponding Japanese Application No. 2017-091882; 5 pages.
Office Acton dated Apr. 8, 2020 in corresponding Chinese Application No. 201810370502.1; 14 pages including English-language translation.
German Office Action dated Dec. 22, 2020, in connection with corresponding DE Application No. 10 2018 109 717.4 (10 pp., including machine-generated English translation).

* cited by examiner

ARM FIXING DEVICE AND REDUCER REPLACEMENT METHOD

CROSS-REFERENCE TO RELATED APPLICATIONS

This application claims the benefit of Japanese Patent Application No. 2017-091882, the content of which is incorporated herein by reference.

FIELD

The present invention relates to an arm fixing device and a reducer replacement method.

BACKGROUND

A conventional industrial robot includes a servo motor with a built-in brake as arm drive means. When a drive current of the servo motor is cut off, the brake is automatically actuated to prevent the arm from falling because of gravity. Additionally, in order to temporarily prevent falling of the arm in place of the servo motor when the servo motor is replaced for reasons such as failure, a robot has been known which can steplessly change the position of a stopper on which the arm abuts (see Japanese Unexamined Patent Application, Publication No. 2015-163414, for example).

SUMMARY

An aspect of the present invention provides an arm fixing device that fixes, to a supporting member, an arm supported to the supporting member in such a manner as to be rotatable around a horizontal axis, and rotationally driven around the axis through a reducer by power of a servo motor, the arm fixing device including: a bracket that includes close-contact surfaces that are brought into close contact with a mounting surface provided in the supporting member, and a mounting surface provided in any one of the arm and a link for transmitting drive force to the arm, and also includes one of a screw hole or a through hole that is formed to penetrate each of the close-contact surfaces at a position corresponding to a position of the other of a screw hole or a through hole provided in each of the mounting surfaces, and is bridged over the mounting surfaces such that each of the close-contact surfaces is brought into close contact with a corresponding one of the mounting surfaces; and a fastener that penetrates the through hole and is fastened to the screw hole.

Also, another aspect of the present invention provides an arm fixing device that fixes, to a supporting member, an arm supported to the supporting member in such a manner as to be rotatable around a horizontal axis, and rotationally driven around the axis through a reducer by power of a servo motor, the arm fixing device including: a bracket that includes close-contact surfaces that are brought into close contact with a mounting surface provided in the supporting member, and a mounting surface provided in any one of the arm and a link for transmitting drive force to the arm, and also includes a second through hole formed to penetrate each of the close-contact surfaces at a position corresponding to a position of a first through hole provided in each of the mounting surfaces, and is bridged over the mounting surfaces such that each of the close-contact surfaces is brought into close contact with a corresponding one of the mounting surfaces; a bolt that is inserted and penetrates the first through hole and the second through hole from one side; and a nut that is capable of being fastened to the bolt from the other side.

Also, another aspect of the present invention provides a method of replacing a reducer of a robot including an arm that is supported to a supporting member in such a manner as to be rotatable around a horizontal axis, and is rotationally driven around the axis through the reducer by power of a servo motor, the method including: bridging, over mounting surfaces, a bracket including close-contact surfaces that are brought into close contact with the mounting surface provided in the supporting member, and the mounting surface provided in any one of the arm and a link swingably connected to the arm, and also including one of a screw hole or a through hole that is formed to penetrate each of the close-contact surface at a position corresponding to a position of the other of a screw hole or a through hole provided in each of the mounting surfaces, the bracket bridged over the mounting surfaces such that each of the close-contact surfaces is brought into close contact with a corresponding one of the mounting surfaces; and allowing a fastener to penetrate the through hole and be fastened to the screw hole, to thereby replace the reducer with the arm fixed to the supporting member.

DETAILED DESCRIPTION

Hereinafter, an arm fixing device 1 of an embodiment of the present invention will be described with reference to the drawings.

Figure 1:
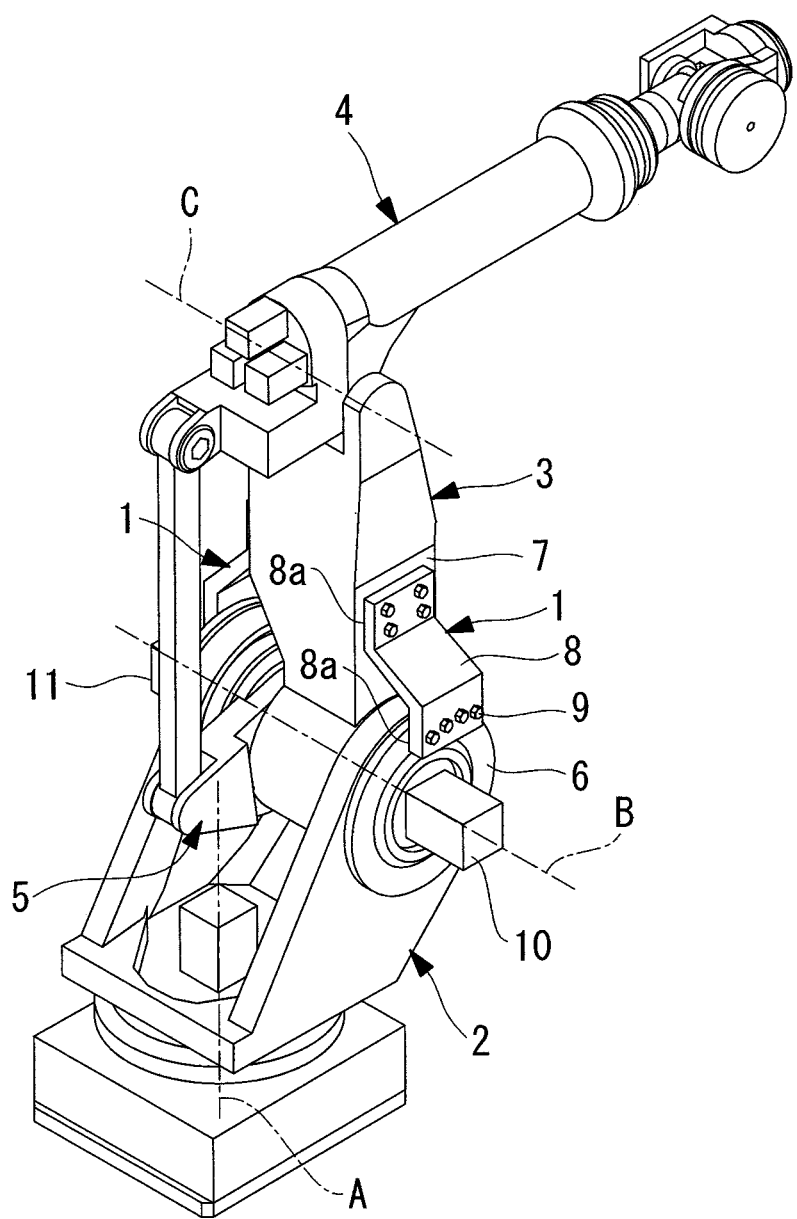
FIG. 1 is a perspective view of a robot equipped with an arm fixing device of an embodiment of the present invention, which is an arm fixing device that fixes a first arm to a base member, as viewed from one direction.
Figure 2:
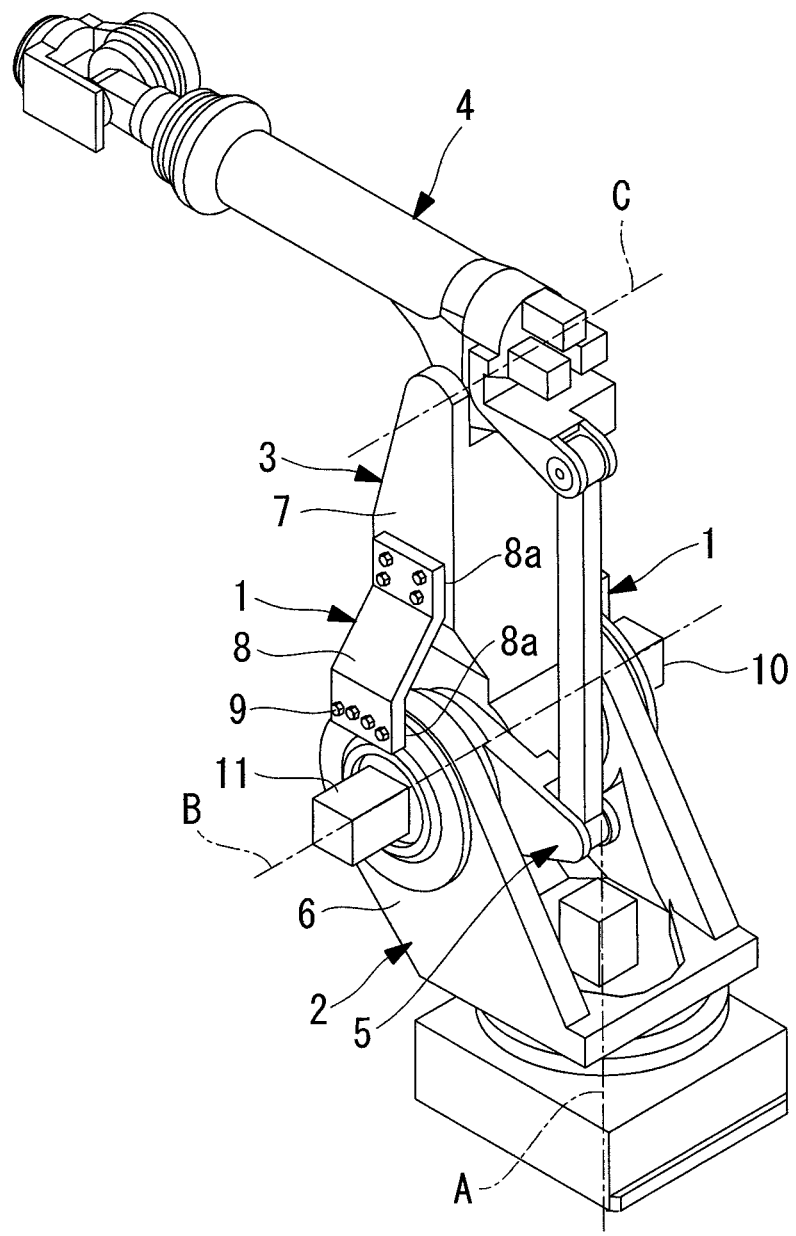
FIG. 2 is a perspective view of the robot equipped with the arm fixing device of FIG. 1, as viewed from another direction.

As illustrated in FIGS. 1 and 2, the arm fixing device 1 of the embodiment is a device that fixes a base member (supporting member) 2 supported in such a manner as to be rotatable around a vertical first axis A, and a first arm (arm) 3 supported in such a manner as to be rotatable relative to the base member 2, around a horizontal second axis (axis) B. In the drawings, reference numeral 4 indicates a second arm supported in such a manner as to be rotatable relative to the first arm 3, around a third axis C parallel to the second axis B, while reference numeral 5 indicates a link connected to the base end of the second arm 4.

The first arm 3 is rotatably supported to the base member 2 in a double fixed manner, by a bearing (not shown) arranged between the first arm 3 and the base member 2 on one side in the direction extending along the second axis B, and a reducer (not shown) arranged between the first arm 3 and the base member 2 on the other side in the direction extending along the second axis B. Mounting surfaces 6, 7 extending along the vertical direction are provided on both side surfaces in the vicinity of the upper end of the base member 2, and both side surfaces of the first arm 3, respectively. Multiple screw holes are provided in the mounting surfaces 6, 7. Reference numeral 10 indicates a motor (servo motor) that drives the first arm 3, and reference numeral 11 indicates a motor that drives the second arm 4 through the link 5.

The mounting surfaces 6, 7 and the screw holes may be provided to attach an arbitrary device on side surfaces of the base member 2 and the first arm 3, or to attach a fixing member for laying a linear object such as wiring and piping through side surfaces of the base member 2 and the first arm 3, for example.

The arm fixing device 1 includes a bracket 8 having a shape bridged over the base member 2 and the first arm 3, and multiple bolts (fasteners) 9 that fix the bracket 8 to the base member 2 and the first arm 3.

The bracket 8 has a shape including two close-contact surfaces 8a that are placed in positions corresponding to the mounting surface 6 of the base member 2 and the mounting surface 7 of the first arm 3, when the first arm 3 is placed at a predetermined angle relative to the base member 2, for example, placed vertically relative to the base member 2, as illustrated in FIGS. 1 and 2.

Additionally, multiple through holes are formed in each close-contact surface 8a of the bracket 8, in positions corresponding to the screw holes in the corresponding mounting surfaces 6, 7. Moreover, the bracket 8 is formed such that it does not block paths for attaching and detaching the motor 10 and the reducer along the second axis B, while the bracket 8 is fixed to the mounting surface 6 of the base member 2.

Hereinafter, a reducer replacement method using the arm fixing device 1 of the embodiment configured in the above manner will be described.

To replace the reducer driving the first arm 3, the first arm 3 is swung around the second axis B to be placed in a predetermined position relative to the base member 2. If the first arm 3 cannot be swung to the predetermined position by driving the motor 10 due to failure in the motor 10 or the reducer, the motor 10 is detached while a part above the first arm 3 is hung by a crane, and the first arm 3 is swung to the predetermined position by the crane.

Next, the close-contact surfaces 8a of the bracket 8 are respectively brought into close contact with the mounting surface 6 of the base member 2 and the mounting surface 7 of the first arm 3, on both sides in the direction extending along the second axis B of the first arm 3. Then, the crane is operated to adjust the angle of the first arm 3, so that the through holes of the bracket 8 are aligned with the screw holes of the first arm 3.

In this state, the bolts 9 are fastened to the screw holes of the mounting surfaces 6, 7 through the through holes. Thus, the close-contact surfaces 8a of the bracket 8 are firmly brought into close contact with the mounting surfaces 6, 7. Frictional force between the close-contact surfaces 8a and the mounting surfaces 6, 7 holds and prevents the first arm 3 not only from rotating around the second axis B, but also from moving in radial and axial directions, relative to the base member 2.

Then, in this state, the crane that hung the first arm 3 is detached from the first arm 3, and the crane instead hangs the reducer by using an eyebolt or the like attached to the reducer. A fixing bolt (not shown) that fixes the reducer to the base member 2 and the first arm 3 is detached, and the reducer is pulled out in the direction extending along the second axis B. Thereafter, another reducer is attached in a reversed procedure, and after the motor 10 is attached, the arm fixing device 1 is detached. Thus, replacement of the reducer is completed.

According to the arm fixing device 1 and the reducer replacement method of the embodiment, the bracket 8 is fixed to the base member 2 and the first arm 3 to prevent the parts from moving relative to each other. Hence, even when the reducer that supports the first arm 3 to the base member 2 is detached, the position of the first arm 3 relative to the base member 2 can be kept from shifting, and the reducer can be replaced easily.

Additionally, from the time point when the first arm 3 is fixed to the base member 2 by the arm fixing device 1 of the embodiment, the first arm 3 no longer needs to be hung by a crane, and therefore the crane can instead be used for hanging the reducer. This is advantageous in that the replacement of the reducer can be performed merely by a single crane.

Note that although the embodiment exemplifies the arm fixing device 1 that fixes the first arm 3 to the base member 2, the invention may instead be applied to an arm fixing device 13 that fixes a second arm (arm) 4 to a base member 2.

Figure 3:
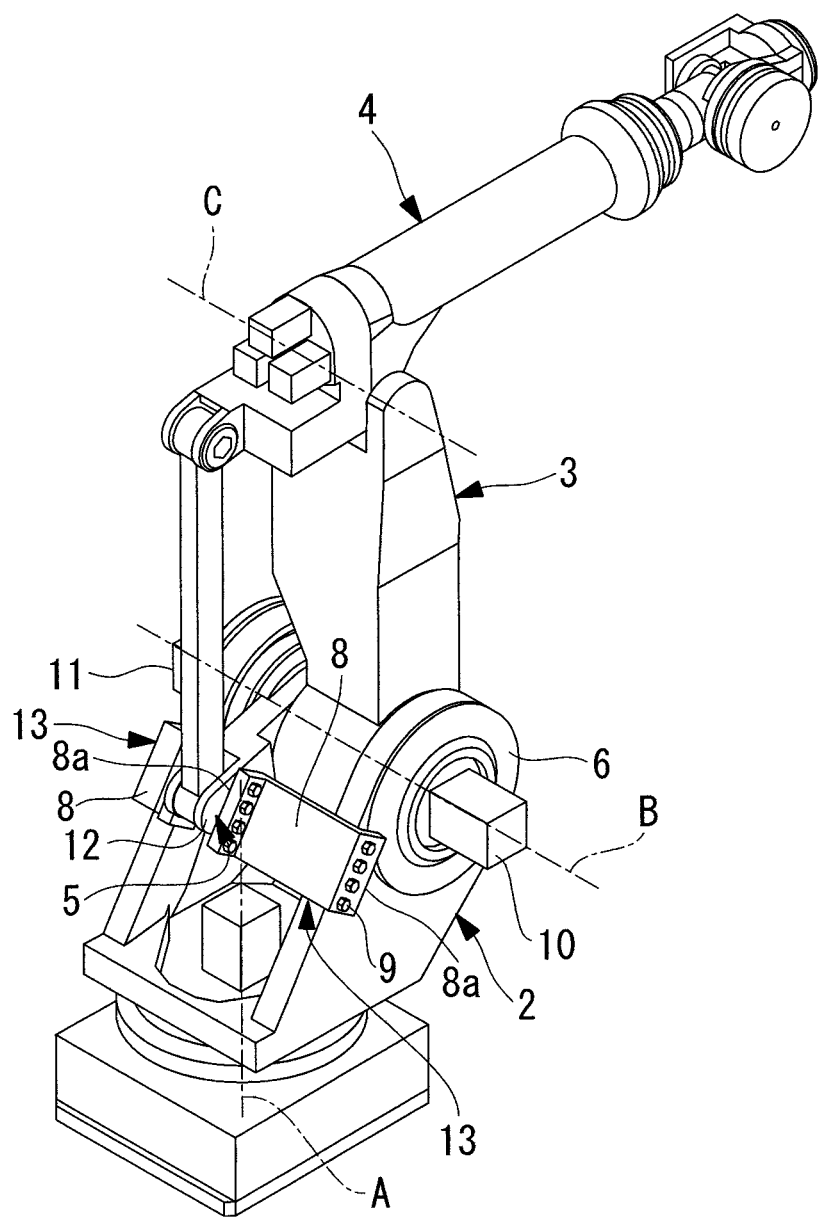
FIG. 3 is a perspective view of a robot equipped with a modification of the arm fixing device of FIG. 1, which is an arm fixing device that fixes a second arm to a base member, as viewed from one direction.
Figure 4:
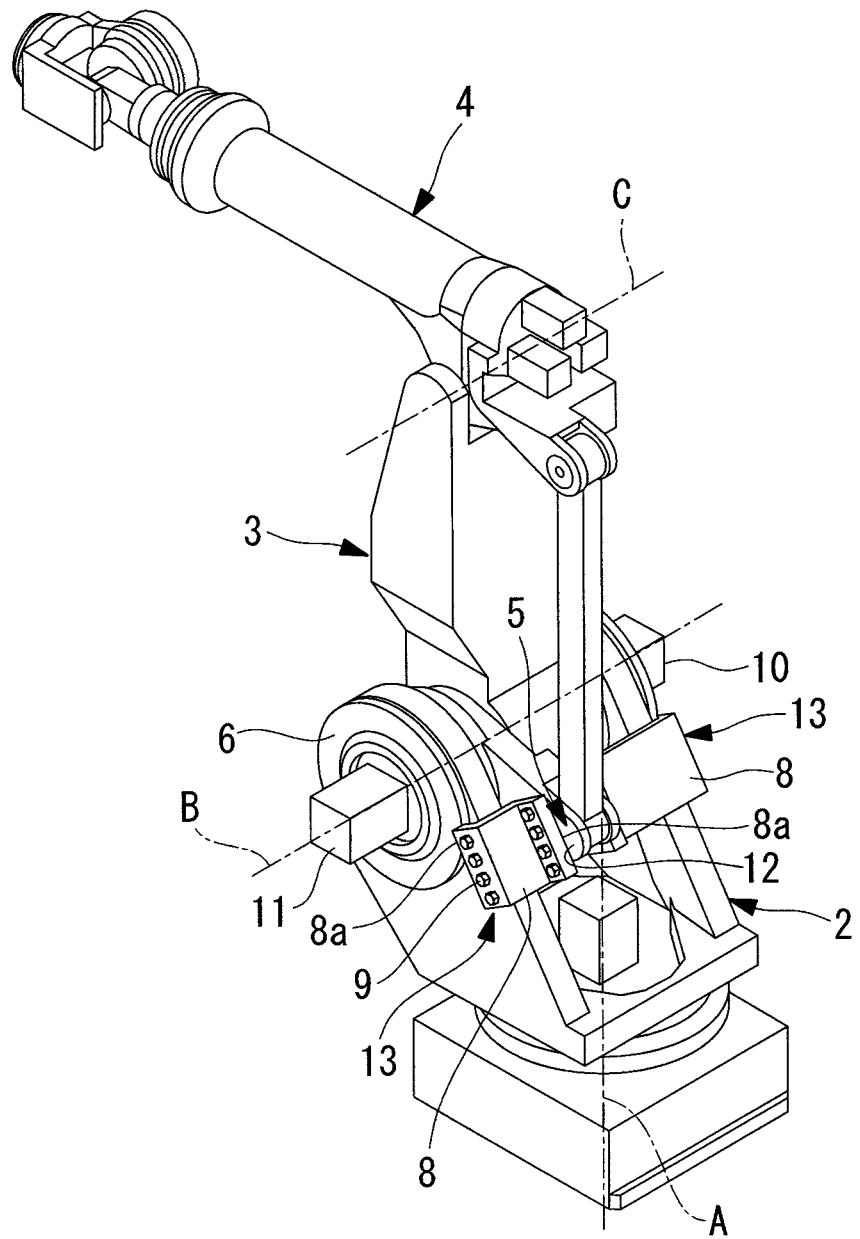
FIG. 4 is a perspective view of the robot equipped with the arm fixing device of FIG. 3, as viewed from another direction.

For example, an example in FIGS. 3 and 4 illustrates a case of a robot configured to swing, through a link 5, the second arm 4 supported to the tip end of a first arm 3 in such a manner as to be swingable around the horizontal third axis C, by a motor 11 and a reducer that rotate around the second axis B of the first arm 3 with respect to the base member 2.

In this case, a bracket 8 is placed in such a manner as to bridge over a mounting surface 6 provided on both side surfaces of the base member 2 and a mounting surface 12 provided on both side surfaces of the link 5, and bolts 9 are fastened to screw holes in the mounting surfaces 6, 12. Thus, close-contact surfaces 8a of the bracket 8 are brought into close contact to fix the link 5 to be unmovable relative to the base member 2, whereby the second arm 4 can be fixed to the base member 2 through the link 5.

Note that although the embodiment adopts the arm fixing device 1 in which the bracket 8 is fixed to the first arm 3 and the second arm 4 by providing screw holes in the mounting surfaces 6, 7, allowing the bolts 9 to penetrate the through holes of the close-contact surfaces 8a, and fastening the bolts 9 to the screw holes of the mounting surfaces 6, 7, the invention is not limited to this. For example, an arm fixing device 1 may include a nut that can be fastened to a bolt 9, a through hole (first through hole) may be provided instead of a screw hole in mounting surfaces 6, 7, the bolt 9 may be inserted from one side through the through hole of the mounting surfaces 6, 7 and a through hole (second through hole) of a close-contact surface 8a, and then the nut may be attached and fastened to the bolt 9 from the other side.

Figure 5:
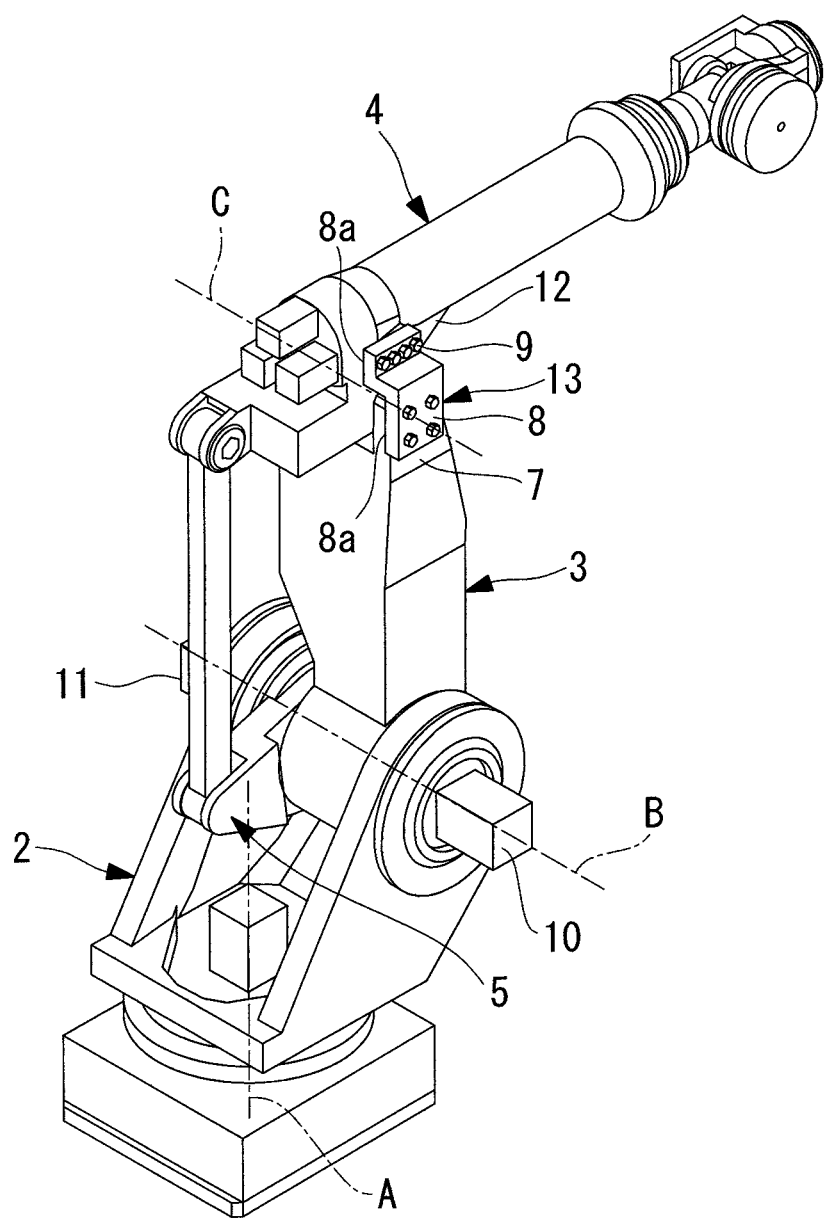
FIG. 5 is a perspective view of a robot equipped with another modification of the arm fixing device of FIG. 1, which is an arm fixing device that fixes a second arm to a first arm, as viewed from one direction.
Figure 6:
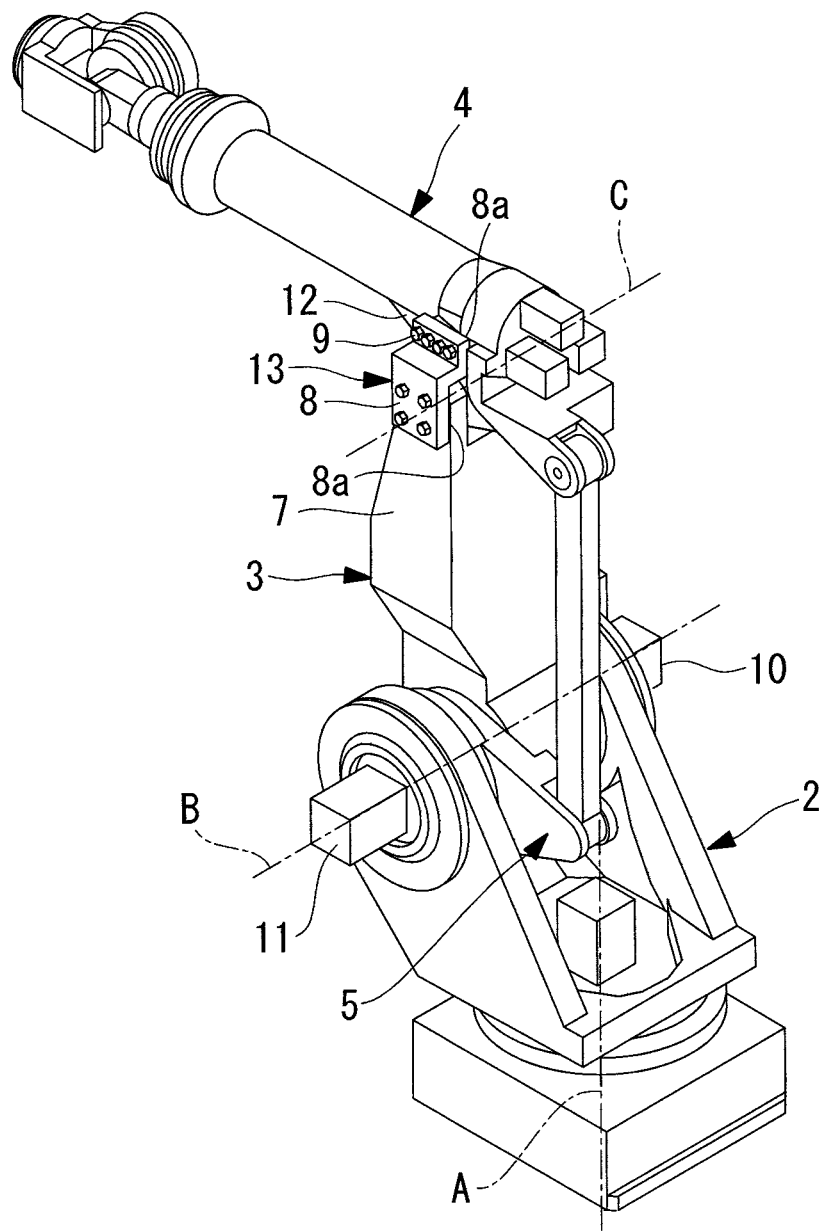
FIG. 6 is a perspective view of the robot equipped with the arm fixing device of FIG. 5, as viewed from another direction.

As the arm fixing device 13 that fixes the second arm 4, a part that fixes the second arm 4 and the first arm (supporting member) 3 may be adopted, as illustrated in FIGS. 5 and 6.

The above embodiments exemplify the bracket 8 formed of a single member having two close-contact surfaces 8a that can be brought into close contact with both of the mounting surface 7 of the first arm 3 and the mounting surface 6 of the base member 2. Instead, the bracket 8 may be divided as illustrated in FIG. 7.

Figure 7:
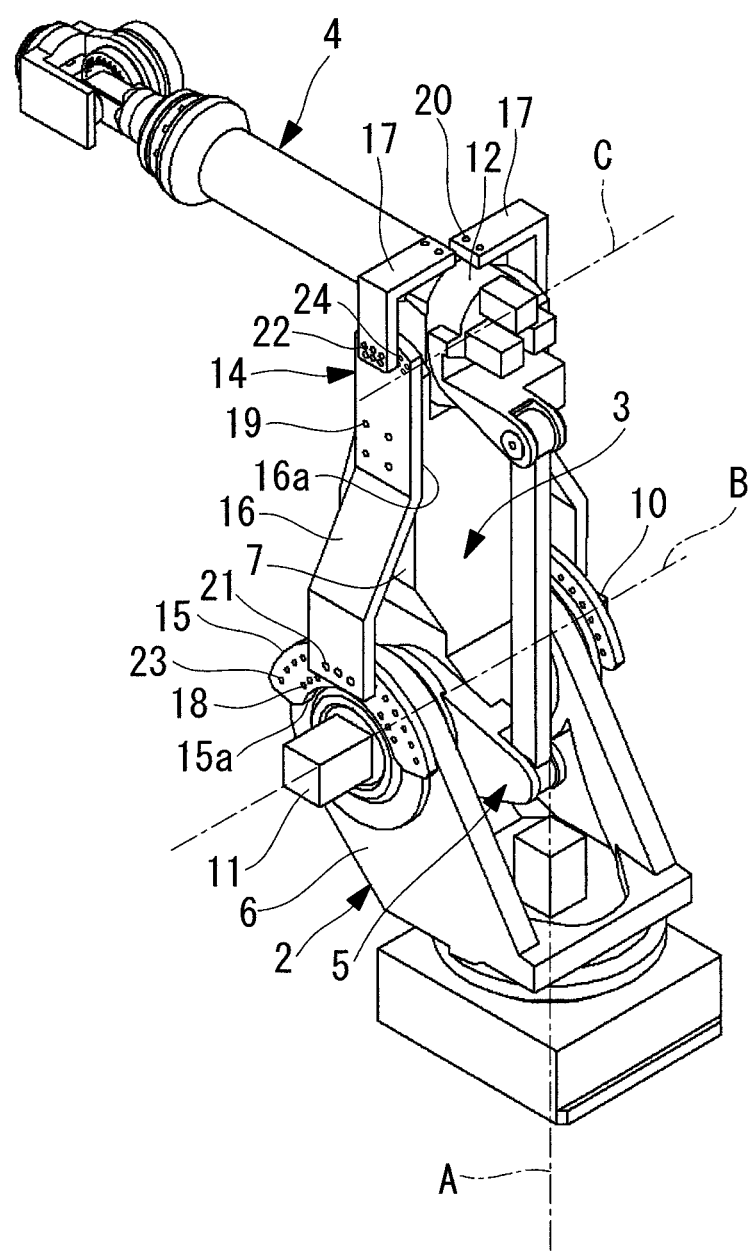
FIG. 7 is a perspective view of a robot equipped with another modification of the arm fixing device of FIG. 1, which is an arm fixing device that fixes a first arm to a base member, and a second arm to the first arm, as viewed from one direction.
Figure 8:
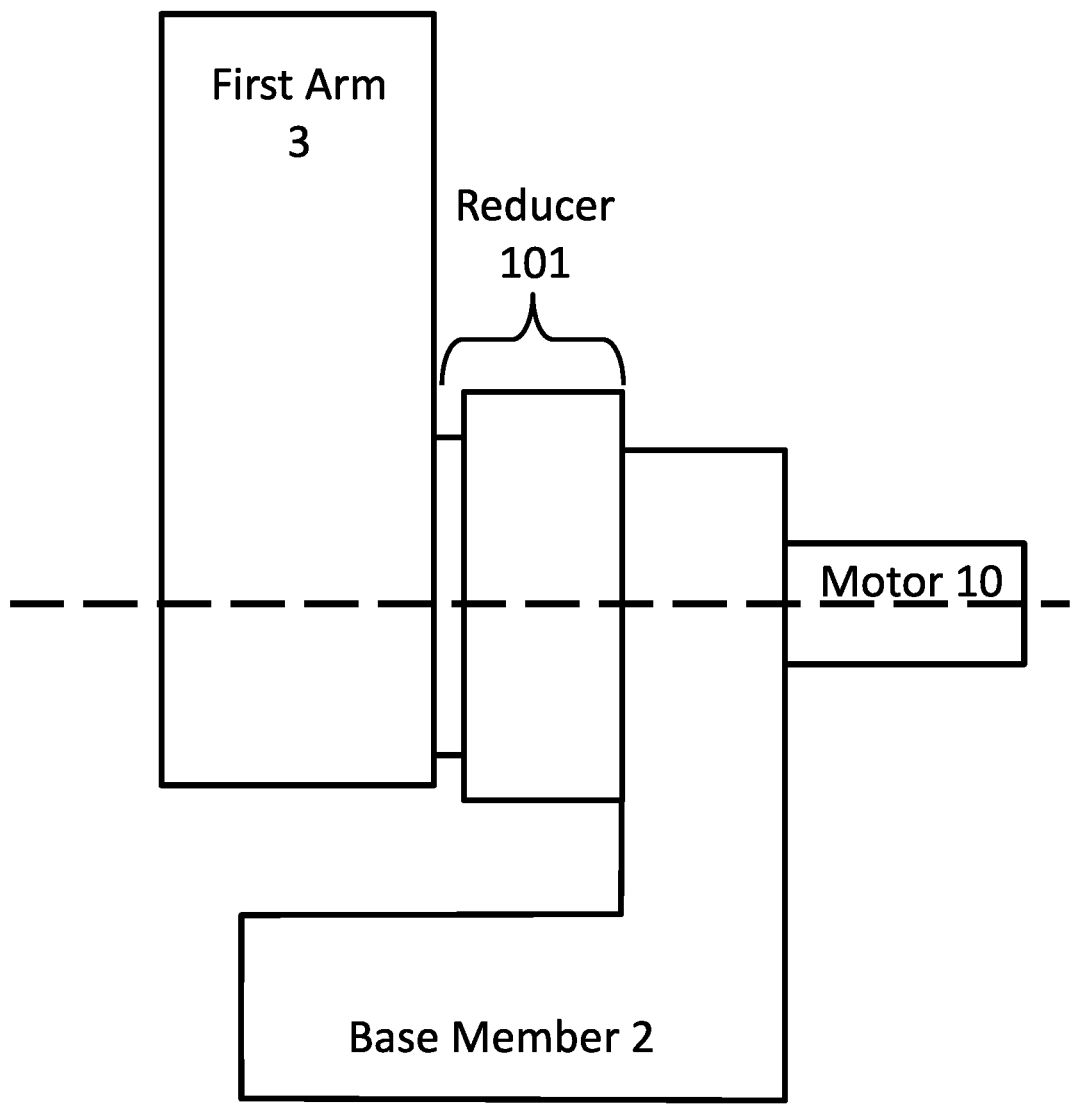
FIG. 8 is a schematic view of a motorized joint of an industrial robot.

Specifically, in the example illustrated in FIG. 7, an arm fixing device 14 includes a first bracket part (first bracket) 15 having a first close-contact surface (close-contact surface) 15a that is fixed (brought into close contact) to a mounting surface 6 of a base member 2, a second bracket part (first bracket, second bracket) 16 having a second close-contact surface (close-contact surface) 16a that is fixed (brought into close contact) to a mounting surface 7 of a first arm 3, a third bracket part 17 that is fixed to a mounting surface 12 of a second arm 4, bolts (not shown) fastened to screw holes of the mounting surfaces 6, 7, 12 corresponding to the three bracket parts 15, 16, 17, bolts (unillustrated inter-bracket fasteners) connecting the first bracket part 15 and the second bracket part 16, and bolts (not shown) connecting the second bracket part 16 and the third bracket part 17.

In FIG. 7, reference numeral 18 indicates through holes that allow penetration of bolts that fix the first bracket part 15 to the mounting surface 6 of the base member 2, reference numeral 19 indicates through holes that allow penetration of bolts that fix the second bracket part 16 to the mounting surface 7 of the first arm 3, and reference numeral 20 indicates through holes that allow penetration of bolts that fix the third bracket part 17 to the mounting surface 12 of the second arm 4.

Multiple screw holes 23 are provided in the first bracket part 15, at a constant pitch in the circumferential direction along the circumference around the second axis B.

Multiple through holes 21 are provided in the second bracket part 16 at the same pitch as the screw holes 23, along a circumference having the same radius as the screw holes 23, so that the through holes 21 are arranged in positions corresponding to the screw holes 23 of the first bracket part 15 when the second bracket part 16 is fixed to the first arm 3. A sufficient number of the through holes 21 to generate enough frictional force for fixing and preventing shifting of the first arm 3 are provided, and the number of the screw holes 23 is sufficiently bigger than the number of through holes 21.

Additionally, multiple screw holes 24 are provided in the second bracket part 16, so that the screw holes 24 are arranged at a constant pitch along a circumference around the third axis C when the second bracket part 16 is fixed to the first arm 3.

Also, multiple through holes 22 are provided in the third bracket part 17 at the same pitch as the screw holes 24, along a circumference having the same radius as the screw holes 24, so that the through holes 22 are arranged in positions corresponding to the screw holes 24 of the second bracket part 16 when the third bracket part 17 is fixed to the second arm 4. A sufficient number of the through holes 22 to generate enough frictional force for fixing and preventing shifting of the second arm 4 are provided, and the number of the screw holes 24 is sufficiently bigger than the number of through holes 22.

According to the arm fixing device 14 configured in this manner, the first bracket part 15 and the second bracket part 16 can be fixed with a bolt, at an angle of the first arm 3 where the through hole 21 of the second bracket part 16 fixed to the first arm 3 is aligned with one of the screw holes 23 of the first bracket part 15 fixed to the base member 2. Similarly, the second bracket part 16 and the third bracket part 17 can be fixed with a bolt, at an angle of the second arm 4 where the through hole 22 of the third bracket part 17 fixed to the second arm 4 is aligned with one of the screw holes 24 of the second bracket part 16 fixed to the first arm 3.

Since the positions of the first arm 3 and the second arm 4 can thus be fixed without shifting relative to the base member 2, the motors 10, 11 and the reducer can be detached to replace the reducer easily.

In this case, according to the embodiment, the through hole 21 provided in the second bracket part 16 can be aligned with the screw hole 23 provided in the first bracket part 15 at multiple angles of the first arm 3, whereby the first arm 3 can be fixed to the base member 2 at multiple positions. Similarly, the through hole 22 provided in the third bracket part 17 can be aligned with the screw hole 24 provided in the second bracket part 16 at multiple angles of the second arm 4, whereby the second arm 4 can be fixed to the first arm 3 at multiple positions.

As a result, this brings about an advantage that even when the first arm 3 cannot be returned to a predetermined position or the second arm 4 cannot be returned to a horizontal position due to failure or the like in the reducer or the motors 10, 11, the first arm 3 and the second arm 4 can be fixed to the base member 2 merely by moving the arms to the closest position where the screw hole 24 is aligned with the through hole 22. Hence, the replacement of the reducer can be facilitated.

Additionally, although the embodiment exemplifies a case where the three bracket parts 15, 16, 17 form the arm fixing device 14, the invention is also applicable to two sets of the bracket parts 15, 16, 17, the first arm 3 alone, or the second arm 4 alone.

Moreover, the through holes 21, 22 provided in the second bracket part 16 and the third bracket part 17 may respectively be long holes extending in the circumferential direction around the second axis B and the third axis C. This allows the first arm 3 to be fixed at an arbitrary angle relative to the base member 2, and the second arm 4 to be fixed at an arbitrary angle relative to the first arm 3.

What is more, in FIG. 7, the arm fixing device 14 fixes not only the first arm 3 to the base member 2 but also the second arm 4 to the first arm 3. Instead, a second bracket part 16 for fixing the first arm 3 to the base member 2, and a second bracket part 16 for fixing the second arm 4 to the first arm 3 may be provided separately.

From the above-described embodiment, the following invention is derived.

An aspect of the present invention provides an arm fixing device that fixes, to a supporting member, an arm supported to the supporting member in such a manner as to be rotatable around a horizontal axis, and rotationally driven around the axis through a reducer by power of a servo motor, the arm fixing device including: a bracket that includes close-contact surfaces that are brought into close contact with a mounting surface provided in the supporting member, and a mounting surface provided in any one of the arm and a link for transmitting drive force to the arm, and also includes one of a screw hole or a through hole that is formed to penetrate each of the close-contact surfaces at a position corresponding to a position of the other of a screw hole or a through hole provided in each of the mounting surfaces, and is bridged over the mounting surfaces such that each of the close-contact surfaces is brought into close contact with a corresponding one of the mounting surfaces; and a fastener that penetrates the through hole and is fastened to the screw hole.

According to this aspect, the arm is arranged in a predetermined rotated position relative to the supporting member, so that the through hole or the screw hole provided in one close-contact surface of the bracket is aligned with the screw hole or the through hole provided in the mounting surface of the supporting member, the through hole or the screw hole provided in the other close-contact surface is aligned with the screw hole or the through hole provided in the mounting surface of the arm or the link, and the fastener penetrating the through hole is fastened to the screw hole. Thus, each close-contact surface is brought into close contact with a corresponding one of the mounting surfaces, and frictional force thereof keeps the arm from moving relative to the supporting member not only in the rotation direction, but also in radial and axial directions. Accordingly, even when the reducer that supports the arm rotatably to the supporting member is detached, the arm is kept unmovable relative to the supporting member, and the reducer can be replaced easily.

In the above aspect, the bracket may include a first bracket having a first close-contact surface that is brought into close contact with the mounting surface of the supporting member, a second bracket having a second close-contact surface that is brought into close contact with the mounting surface of any one of the arm and the link, and an inter-bracket fastener capable of fixing the first bracket and the second bracket at a plurality of positions to which the first bracket and the second bracket are moved relative to each other.

This can bring the first close-contact surface of the first bracket into close contact with the mounting surface of the supporting member to fasten it with a fastener, bring the second close-contact surface of the second bracket into close contact with the mounting surface of the arm or the link to fasten it with a fastener, and fix the first bracket and the second bracket by the inter-bracket fastener.

Accordingly, the bracket in which the first bracket and the second bracket are fixed by the inter-bracket fastener can be arranged between the supporting member and the arm, to prevent movement of the arm relative to the supporting member, not only in the rotation direction, but also in radial and axial directions. In this case, the first bracket and the second bracket can be fixed relative to each other at a plurality of positions to which the arm is rotated relative to the supporting member around an axis.

Also, in the above aspect, the inter-bracket fastener may be capable of fixing the first bracket and the second bracket at a position to which the first bracket and the second bracket are moved steplessly relative to each other.

This allows the first bracket and the second bracket to be fixed relative to each other at an arbitrary position to which the arm is rotated relative to the supporting member around the axis.

Also, in the above aspect, the supporting member may be a base member.

This fixes the arm to the base member, and the arm and the base member do not shift relative to each other, even when a reducer connecting the two is detached.

Also, in the above aspect, the supporting member may be another arm.

This fixes the arm to the other arm, and the arms do not shift relative to each other, even when a reducer connecting the two is detached.

Also, another aspect of the present invention provides an arm fixing device that fixes, to a supporting member, an arm supported to the supporting member in such a manner as to be rotatable around a horizontal axis, and rotationally driven around the axis through a reducer by power of a servo motor, the arm fixing device including: a bracket that includes close-contact surfaces that are brought into close contact with a mounting surface provided in the supporting member, and a mounting surface provided in any one of the arm and a link for transmitting drive force to the arm, and also includes a second through hole formed to penetrate each of the close-contact surfaces at a position corresponding to a position of a first through hole provided in each of the mounting surfaces, and is bridged over the mounting surfaces such that each of the close-contact surfaces is brought into close contact with a corresponding one of the mounting surfaces; a bolt that is inserted and penetrates the first through hole and the second through hole from one side; and a nut that is capable of being fastened to the bolt from the other side.

Also, another aspect of the present invention provides a method of replacing a reducer of a robot including an arm that is supported to a supporting member in such a manner as to be rotatable around a horizontal axis, and is rotationally driven around the axis through the reducer by power of a servo motor, the method including: bridging, over mounting surfaces, a bracket including close-contact surfaces that are brought into close contact with the mounting surface provided in the supporting member, and the mounting surface provided in any one of the arm and a link swingably connected to the arm, and also including one of a screw hole or a through hole that is formed to penetrate each of the close-contact surface at a position corresponding to a position of the other of a screw hole or a through hole provided in each of the mounting surfaces, the bracket bridged over the mounting surfaces such that each of the close-contact surfaces is brought into close contact with a corresponding one of the mounting surfaces; and allowing a fastener to penetrate the through hole and be fastened to the screw hole, to thereby replace the reducer with the arm fixed to the supporting member.

REFERENCE SIGNS LIST 1, 13, 14 arm fixing device
2 base member (supporting member)
3 first arm (arm, supporting member)
4 second arm (arm)
6, 7, 12 mounting surface
8 bracket
8a close-contact surface
9 bolt (fastener)
10 motor (servo motor)
15 first bracket part (first bracket)
15a first close-contact surface (close-contact surface)
16 second bracket part (first bracket, second bracket)
16a second close-contact surface (close-contact surface)
18, 19, 20, 21, 22 through hole
B second axis (axis)

The invention claimed is:
1. An arm fixing device that fixes, to a supporting member, an arm supported to the supporting member in such a manner as to be rotatable around a horizontal axis, and rotationally driven around the axis through a reducer by power of a servo motor for replacement of the reducer, the arm fixing device comprising:
   a bracket that
      includes close-contact surfaces that are brought into close contact with a mounting surface provided in the supporting member, and a mounting surface provided in any one of the arm and a link for transmitting drive force to the arm, and also includes one of a screw hole or a through hole that is formed to penetrate each of the close-contact surfaces at a position corresponding to a position of the other of a screw hole or a through hole provided in each of the mounting surfaces, and is bridged over the mounting surfaces such that each of the close-contact surfaces is brought into close contact with a corresponding one of the mounting surfaces; and a fastener that penetrates the through hole and is fastened to the screw hole, wherein, each of the close-contact surfaces are either co-planar or parallel-planar with one another; and frictional force between the close-contact surfaces and the mounting surfaces renders the arm immovable relative to the supporting member.

2. The arm fixing device according to claim 1, wherein the bracket includes a first bracket having a first close-contact surface that is brought into close contact with the mounting surface of the supporting member, a second bracket having a second close-contact surface that is brought into close contact with the mounting surface of any one of the arm and the link, and an inter-bracket fastener capable of fixing the first bracket and the second bracket at a plurality of positions to which the first bracket and the second bracket are moved relative to each other.

3. The arm fixing device according to claim 2, wherein the inter-bracket fastener is capable of fixing the first bracket and the second bracket at a position to which the first bracket and the second bracket are moved relative to each other.

4. The arm fixing device according to claim 1, wherein the supporting member is a base member.

5. The arm fixing device according to claim 1, wherein the supporting member is another arm.

6. An arm fixing device that fixes, to a supporting member, an arm supported to the supporting member in such a manner as to be rotatable around a horizontal axis, and rotationally driven around the axis through a reducer by power of a servo motor for replacement of the reducer, the arm fixing device comprising:

a bracket that includes close-contact surfaces that are brought into close contact with a mounting surface provided in the supporting member, and a mounting surface provided in any one of the arm and a link for transmitting drive force to the arm, and also includes a second through hole formed to penetrate each of the close-contact surfaces at a position corresponding to a position of a first through hole provided in each of the mounting surfaces, and is bridged over the mounting surfaces such that each of the close-contact surfaces is brought into close contact with a corresponding one of the mounting surfaces;

a bolt that is inserted and penetrates the first through hole and the second through hole from one side; and a nut that is fastened to the bolt from the other side, wherein, each of the close-contact surfaces are either co-planar or parallel-planar with one another; and frictional force between the close-contact surfaces and the mounting surfaces renders the arm immovable relative to the supporting member.

7. A method of replacing a reducer of a robot including an arm that is supported to a supporting member in such a manner as to be rotatable around a horizontal axis, and is rotationally driven around the axis through the reducer by power of a servo motor, the method comprising:

bridging, over mounting surfaces, a bracket including close-contact surfaces that are brought into close contact with the mounting surface provided in the supporting member, and the mounting surface provided in any one of the arm and a link swingably connected to the arm, and also including one of a screw hole or a through hole that is formed to penetrate each of the close-contact surfaces at a position corresponding to a position of the other of a screw hole or a through hole provided in each of the mounting surfaces, the bracket bridged over the mounting surfaces such that each of the close-contact surfaces is brought into close contact with a corresponding one of the mounting surfaces; and allowing a fastener to penetrate the through hole and be fastened to the screw hole, to thereby replace the reducer with the arm fixed to the supporting member, wherein, each of the close-contact surfaces are either co-planar or parallel-planar with one another; and frictional force between the close-contact surfaces and the mounting surfaces renders the arm immovable relative to the supporting member.

* * * * *